United States Patent
Bouda

(10) Patent No.: US 11,676,145 B2
(45) Date of Patent: *Jun. 13, 2023

(54) METHOD AND APPARATUS FOR AUTHENTICATING AND PROCESSING SECURE TRANSACTIONS USING A MOBILE DEVICE

(71) Applicant: Bell Identification B.V., Rotherdam (NL)

(72) Inventor: Mohammed Chakib Bouda, Rotherdam (NL)

(73) Assignee: Bell Identification B.V., Rotherdam (NL)

( * ) Notice: Subject to any disclaimer, the term of this patent is extended or adjusted under 35 U.S.C. 154(b) by 259 days.

This patent is subject to a terminal disclaimer.

(21) Appl. No.: 17/137,912

(22) Filed: Dec. 30, 2020

(65) Prior Publication Data

US 2021/0117976 A1    Apr. 22, 2021

Related U.S. Application Data

(63) Continuation of application No. 15/555,481, filed as application No. PCT/EP2016/054482 on Mar. 3, 2016, now Pat. No. 10,915,902.

(30) Foreign Application Priority Data

Mar. 5, 2015    (GB) ..................................... 1503762

(51) Int. Cl.
*G06Q 20/40* (2012.01)
*G06Q 20/32* (2012.01)
(Continued)

(52) U.S. Cl.
CPC ......... *G06Q 20/4012* (2013.01); *G06Q 20/20* (2013.01); *G06Q 20/202* (2013.01);
(Continued)

(58) Field of Classification Search
CPC ............. G06Q 20/4012; G06Q 20/202; G06Q 20/327; G06Q 20/3278; G06Q 20/38215;
(Continued)

(56) References Cited

U.S. PATENT DOCUMENTS

| | | |
|---|---|---|
| 2002/0091648 A1 | 7/2002 | Phillips et al. |
| 2004/0019564 A1 | 1/2004 | Goldthwaite et al. |

(Continued)

FOREIGN PATENT DOCUMENTS

| | | |
|---|---|---|
| GB | 2512944 | 10/2014 |
| WO | 2014049136 | 4/2014 |
| WO | 2014130222 | 8/2014 |

OTHER PUBLICATIONS

Application No. EP20173311.0, Office Action, dated Apr. 5, 2022, 9 pages.

(Continued)

*Primary Examiner* — Patrick McAtee
*Assistant Examiner* — Zesheng Xiao
(74) *Attorney, Agent, or Firm* — Kilpatrick Townsend & Stockton LLP

(57) ABSTRACT

A method and apparatus for processing secure transactions of a requested service at a merchant point of sale (POS) using a customer mobile device and a virtual payment gateway (VPG) server, the method comprising an authentication and a transaction. The activation establishes a mobile device transport key (mTK) at the mobile device and a server, and assigns a mobile application identifier (MAID) to a mobile application of the mobile device. The transaction is based on generating a mobile device transport session key (msTK) derived from a server generated session ID and the mobile device transport key (mTK) generated during activation. The transaction of the requested service is initiated by the customer mobile device and is processed without
(Continued)

storing confidential data such as financial account data or financial account identification data at the POS and/or the customer mobile.

20 Claims, 4 Drawing Sheets

(51) Int. Cl.
| | |
|---|---|
| *G06Q 20/38* | (2012.01) |
| *G06Q 20/20* | (2012.01) |
| *H04L 9/14* | (2006.01) |
| *H04L 9/30* | (2006.01) |
| *H04L 9/32* | (2006.01) |

(52) U.S. Cl.
CPC ....... *G06Q 20/327* (2013.01); *G06Q 20/3226* (2013.01); *G06Q 20/3278* (2013.01); *G06Q 20/3829* (2013.01); *G06Q 20/38215* (2013.01); *H04L 9/14* (2013.01); *H04L 9/30* (2013.01); *H04L 9/3226* (2013.01); *H04L 9/3242* (2013.01); *G06Q 2220/00* (2013.01); *H04L 2209/56* (2013.01)

(58) Field of Classification Search
CPC .. G06Q 20/3829; G06Q 2220/00; H04L 9/14; H04L 9/30; H04L 2209/56
USPC .......................................................... 705/71
See application file for complete search history.

(56) References Cited

U.S. PATENT DOCUMENTS

| | | |
|---|---|---|
| 2005/0287990 A1 | 12/2005 | Mononen et al. |
| 2006/0187900 A1 | 8/2006 | Akbar |
| 2007/0203685 A1 | 8/2007 | Takano |
| 2014/0207682 A1 | 7/2014 | Wolfond et al. |
| 2018/0047023 A1 | 2/2018 | Bouda |

OTHER PUBLICATIONS

"Ssl_ TIs Mutual Authentication Primer", cafesoft.com, Jan. 2015,.
EP16707461.6, "Notification Regarding the Date of Oral Proceeding", dated Jan. 20, 2020, 6 pages.
EP16707461.6, "Summons to Attend Oral Proceedings", dated Jun. 26, 2019, 9 pages.
EP20173311.0, "Extended European Search Report", dated Jul. 1, 2020, 10 pages.
EP16707461.6, "Communication Pursuant to Article 94(3) EPC," dated Jul. 5, 2018, 7 Pages.
PCT/EP2016/054482, "Notification Concerning Transmittal of Copy of International Preliminary Report on Patentability" dated Sep. 14, 2017, 9 Pages.
PCT/EP2016/054482, "Notification of Transmittal of the International Search Report and the Written Opinion of the International Searching Authority" dated Apr. 12, 2016, 12 Pages.
U.S. Appl. No. 15/555,481, "Non-Final Office Action", dated Sep. 25, 2019, 21 Pages.
U.S. Appl. No. 15/555,481, "Final Office Action", dated Apr. 28, 2020, 19 pages.
U.S. Appl. No. 15/555,481, "Notice of Allowance", dated Oct. 5, 2020, 8 pages.

METHOD AND APPARATUS FOR AUTHENTICATING AND PROCESSING SECURE TRANSACTIONS USING A MOBILE DEVICE

This application is a continuation application of U.S. patent application Ser. No. 15/555,481, filed on Sep. 1, 2017, which is a national phase of PCT/EP2016/054482, filed on Mar. 3, 2016, which claims priority to GB 1503762.5, filed on Mar. 5, 2015, which are all herein incorporated by reference in their entirety.

FIELD OF THE INVENTION

This invention relates generally to methods and apparatus for processing secure transactions using a mobile device, and more particularly for securely processing payment transactions, using mobile phones and smartphones.

BACKGROUND OF THE INVENTION

There is an ongoing interest in providing financial services through mobile devices such as mobile phones and smartphones. Typically these financial services include making transactions, such as purchasing goods, by making payments from a user financial account using the mobile device.

In order to make purchases by payments from a user account using a mobile device it is necessary to exchange information between a user mobile device, a vendor point of sale (POS) device and an acquiring network within a bank transaction processing system, and it is necessary to make these exchanges of information in a secure manner in order to prevent fraud.

Recently, attempts have been made to enhance these payment systems with a mobile point of sale (mPOS), to extend acquiring network of a bank transaction processing system to cover more merchant locations. Typically, mPOS is a mobile device itself such as smartphone, tablet computer or dedicated wireless device that performs functions of a POS terminal including a card reader to accept payment customer payment cards. However, methods and systems of making payments through a merchant's mPOS and customer's mobile device suffer from a number of problems. It is difficult for the bank to maintain control of the payment process, because this generally requires the co-operation of other parties, raising issues of control, trust, security, and reliability. Further, they may require large amounts of memory or processing power on the mobile devices of the mPOS and the customer.

There is a need for an improved means for providing secure services such as making payment transactions on a mobile device within POS and mPOS payment systems.

SUMMARY OF THE INVENTION

An aspect of the invention is a method of processing secure transactions using a mobile device, the method comprising an authentication and a transaction of a requested service, the authentication comprising, registering the mobile device with the server by receiving activation data from a server and verifying the activation data with the server; the server generating an activation session identifier private and public key certificates, and sending the activation session identifier to the mobile device; the mobile device receiving and validating the session identifier with the activation session identifier public key certificate; the mobile device generating a mobile device key pair comprising a public key and a private key, and encrypting the mobile device public key using activation data and sending the encrypted mobile device public key with a certificate request to the server; and the server extracting the mobile device public key to verify the certificate request, and generating and storing a mobile device transport key (mTk) and assigning a mobile application identifier of the mobile device; sending the mobile device transport key to the mobile device; and the mobile device receiving and storing the mobile device transport key (mTK); the transaction of the requested service comprising, the mobile device receiving transaction data from a service provider device for the requested service; the mobile device sending a mobile application identifier to the server; the server generating a transaction session identifier and a mobile device session transport key (msTK) based on the transaction session identifier and the mobile device transport key (mTK), and sending the mobile device session transport key (msTK) to the mobile device; the mobile device extracting the mobile device session transport key (msTK), and encrypting the transaction data using the mobile device session transport key (msTK) and sending to the server; the server decrypting the transaction data, and the server verifying the transaction data and the mobile device, if the verifications are successful, the server sending service authorization data to the service provider; and the service provider device completing the requested service.

In an embodiment the session identifier being signed with a private key.

In an embodiment the public key is encrypted with activation data comprising customer activation code or user ID and a session ID. The encryption key may be a password base encryption (PBE) key generated based on the activation data.

In an embodiment the certificate request is generated by the mobile device by creating a pkcs10 and comprising a MAC inside the pkcs10.

In an embodiment the encrypting activation data or user ID using the server certificate public key and sent to server with the pkcs10.

In an embodiment the communication between the mobile device and the server is secure sockets layer (SSL) communication.

In an embodiment the server provider device is a point of sale (POS) terminal.

In an embodiment the server provider device is a mobile point of sale (mPOS) terminal.

In an embodiment the server provider device is a virtual point of sale (vPOS) device.

In an embodiment the server provider device is a website.

In an embodiment the user identity verifier is a personal identification number (PIN).

An aspect of the invention is a method of authentication for processing secure transactions using a mobile device, the method comprising, the authentication comprising, registering the mobile device with the server by receiving activation data from a server and verifying the activation data with the server; the server generating an activation session identifier private and public key certificates, and sending the session identifier to the mobile device; the mobile device receiving and validating the session identifier with the public key certificate; the mobile device generating a key pair comprising a public key and a private key, and encrypting the public key using activation data and sending the encrypted public key with a certificate request to the server; and the server extracting the public key to verify the certificate request, and generating and storing a mobile device transport key (mTK) and assigning a mobile application ID of the mobile device; sending the mobile device transport key to the mobile device; and the mobile device receiving and storing the mobile device transport key (mTK).

An aspect of the invention is a method of transaction for processing secure transactions using a mobile device, the method comprising, the mobile device receiving transaction data from a service provider device; the mobile device sending a mobile application identifier to a server; the server generating a transaction session identifier and a mobile device session transport key (msTK) based on the transaction session identifier and a mobile device transport key (mTK) generated by the server, and sending the mobile device session transport key (msTK) to the mobile device; the mobile device extracting the mobile device session transport key (msTK), and encrypting the transaction data using the mobile device session transport key (msTK) and sending to the server; the server decrypting the transaction data, and the server verifying the transaction data and the mobile device, if the verifications are successful, the server sending service authorization data to the service provider; and the service provider device completing the requested service.

An aspect of the invention is a system of processing secure transactions using a mobile device, the system comprising, a server for authenticating and registering a mobile device for transaction of a requested service, having a registration module, verification module and authorization module; a mobile device in communication with the server and having a an activation module and transaction module; and a service provider device for providing transaction data to the mobile device for a requested service; the activation module of the mobile device and the registration module of the server for registering the mobile device with the server by receiving activation data from a server and verifying the activation data with the server; the server generating an activation session identifier private and public key certificates, and sending the activation session identifier to the mobile device; the mobile device receiving and validating the session identifier with the activation session identifier public key certificate; the mobile device generating a mobile device key pair comprising a public key and a private key, and encrypting the mobile device public key using activation data and sending the encrypted mobile device public key with a certificate request to the server; and the server extracting the mobile device public key to verify the certificate request, and generating and storing a mobile device transport key and assigning a mobile application identifier of the mobile device; sending the mobile device transport key to the mobile device; and the mobile device receiving and storing the mobile device transport key (mTK); and the transaction module of the mobile device and the verification module and authorization module of the server for processing the transaction of the requested service comprising, the mobile device receiving transaction data from a service provider device for the requested service; the mobile device sending a mobile application identifier to the server; the server generating a transaction session identifier and a mobile device session transport key (msTK) based on the transaction session identifier and the mobile device transport key (mTK), and sending the mobile device session transport key (msTK) to the mobile device; the mobile device extracting the mobile device session transport key (msTK), and encrypting the transaction data using the mobile device session transport key (msTK) and sending to the server; the server decrypting the transaction data, and the server verifying the transaction data and the mobile device, if the verifications are successful, the server sending service authorization data to the service provider; and the service provider device completing the requested service.

An aspect of the invention is a system of authentication for processing secure transactions using a mobile device, the system comprising, a server for authenticating and registering a mobile device for transaction of a requested service, having a registration module; and a mobile device in communication with the server and having a an activation module and transaction module; the activation module of the mobile device and the registration module of the server for registering the mobile device with the server by receiving activation data from a server and verifying the activation data with the server; the server generating an activation session identifier private and public key certificates, and sending the activation session identifier to the mobile device; the mobile device receiving and validating the session identifier with the activation session identifier public key certificate; the mobile device generating a mobile device key pair comprising a public key and a private key, and encrypting the mobile device public key using activation data and sending the encrypted mobile device public key with a certificate request to the server; and the server extracting the mobile device public key to verify the certificate request, and generating and storing a mobile device transport key and assigning a mobile application identifier of the mobile device; sending the mobile device transport key to the mobile device; and the mobile device receiving and storing the mobile device transport key (mTK).

An aspect of the invention is a system of transaction for processing secure transactions using a mobile device for a requested service, the system comprising, a server having a registration module, verification module and authorization module; a mobile device in communication with the server and having a transaction module; and a service provider device for providing transaction data to the mobile device for a requested service; the transaction module of the mobile device and the verification module and authorization module of the server for processing the transaction of the requested service, the mobile device receiving transaction data from a service provider device for the requested service; the mobile device sending a mobile application identifier to the server; the server generating a transaction session identifier and a mobile device session transport key (msTK) based on the transaction session identifier and a mobile device transport key (mTK) generated by the server, and sending the mobile device session transport key (msTK) to the mobile device; the mobile device extracting the mobile device session transport key (msTK), and encrypting the transaction data using the mobile device session transport key (msTK) and sending to the server; the server decrypting the transaction data, and the server verifying the transaction data and the mobile device, if the verifications are successful, the server sending service authorization data to the service provider; and the service provider device completing the requested service.

BRIEF DESCRIPTION OF THE DRAWINGS

The accompanying drawings incorporated herein and forming a part of the specification illustrate several aspects of the present invention and, together with the description, serve to explain the principles of the invention. While the invention will be described in connection with certain embodiments, there is no intent to limit the invention to those embodiments described. On the contrary, the intent is to cover all alternatives, modifications and equivalents as included within the scope of the invention as defined by the appended claims. In the drawings:

DETAILED DESCRIPTION

A method and apparatus is disclosed for processing secure transactions of a requested service at a merchant point of sale (POS) using a customer mobile device and a virtual payment gateway (VPG) server. The method comprises an authentication procedure and a transaction procedure. The activation establishes a mobile device transport key (mTK) at the mobile device and a server, and assigns a mobile application identifier (MAID) to a mobile application of the mobile device. The transaction is based on generating a mobile device transport session key (msTK) derived from a server generated session ID and the mobile device transport key (mTK) generated during activation. The transaction of the requested service is initiated by the customer mobile device and is processed without storing confidential data such as financial account data or financial account identification data at the POS and/or the customer mobile.

Figure 1:
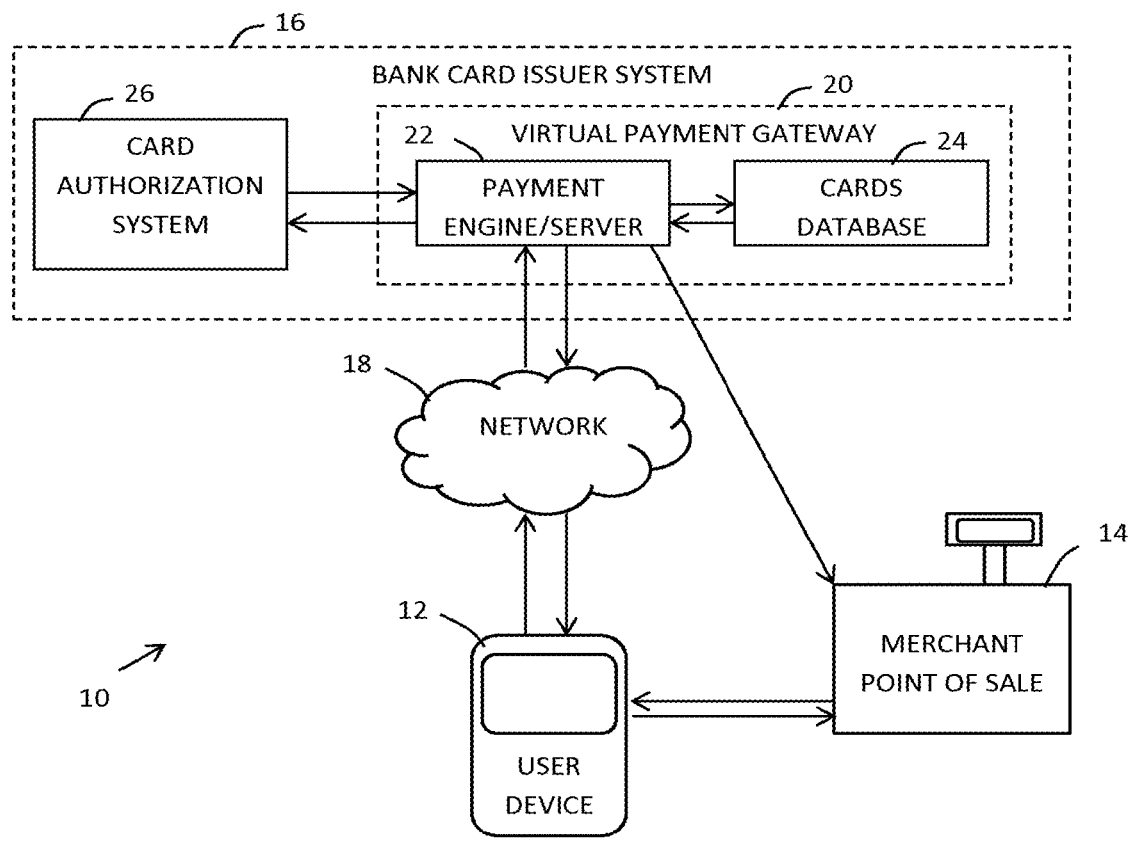
FIG. 1 is a simplified block diagram of a system in which the methods and apparatus in accordance with the invention may be embodied.

Referring to FIG. 1, a simplified block diagram 10 is shown of a system in which the methods and apparatus in accordance with the invention may be embodied. The system comprises a mobile device 10 of a user/consumer, a merchant point of sale (POS) 14, and a bank card issuer system 16. The mobile device 12 and the bank card issuer system 14 may communicate wired or wirelessly via a network 18 such as the internet or the like. The bank card issuer system may comprise a virtual payment gateway 20, comprising a virtual payment gateway (VPG) payment engine/server 22, a card database 24, and a card authorization system 26

Figure 2:
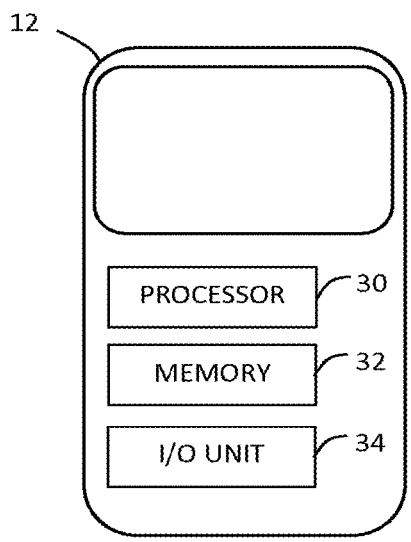
FIG. 2 is a simplified schematic view of a mobile device in accordance with an embodiment of the invention.

Referring to FIG. 2, a simplified schematic view is shown of a mobile device 12 in accordance with an embodiment of the invention. The mobile device comprises a processor 30, a memory 32, and mobile device input/output (I/O) unit 34. The mobile device may be a mobile phone, smartphone, tablet computer, or the like.

Figure 3:
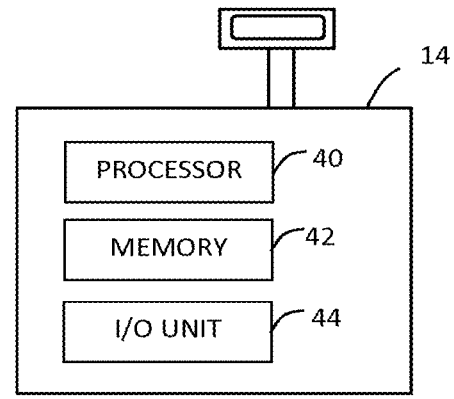
FIG. 3 is a simplified schematic view of a point of sale (POS) terminal in accordance with an embodiment of the invention.

Referring to FIG. 3, a simplified schematic view is shown of a point of sale (POS) terminal 14 in accordance with an embodiment of the invention. The POS terminal comprises a processor 40, memory 42, and POS terminal I/O unit 44. The POS terminal may be a mobile POS (mPOS) terminal smartphone, tablet computer or dedicated wireless device that performs functions of a POS terminal including a card reader to accept payment customer payment cards.

Figure 4:
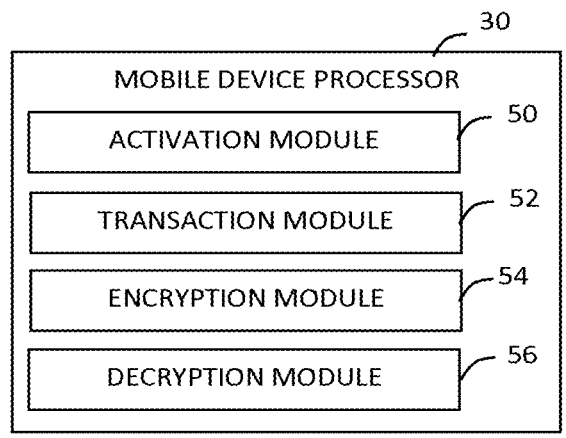
FIG. 4 is a simplified block diagram of a mobile device processor in accordance with an embodiment of the invention.

Referring to FIG. 4, a simplified block diagram is shown of a mobile device processor 30 in accordance with an embodiment of the invention. A mobile application of the mobile device 12 may run on the mobile device processor. The mobile device processor may comprise an activation module 50, a transaction module 52, an encryption module 54, and a decryption module 56.

Figure 5:
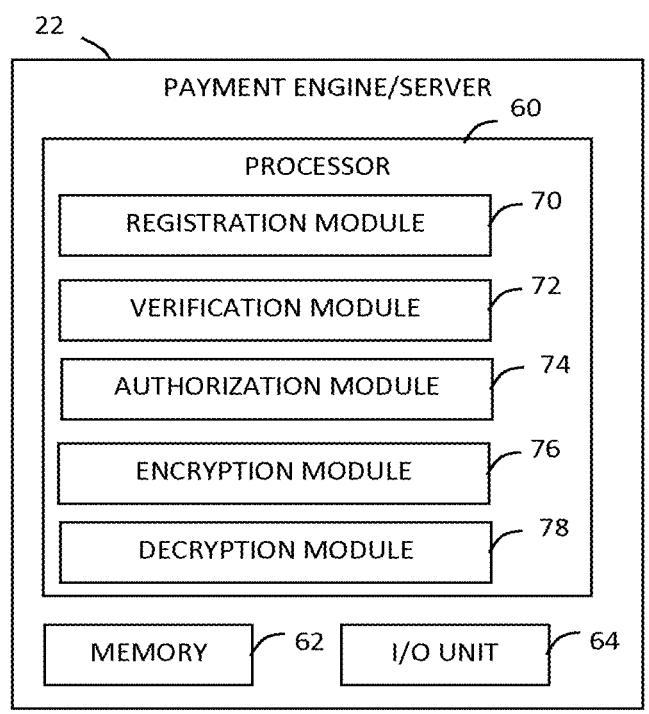
FIG. 5 is a simplified block diagram of a virtual payment gateway or server in accordance with an embodiment of the invention.

Referring to FIG. 5, a simplified block diagram is shown of a virtual payment gateway or server 22 in accordance with an embodiment of the invention. The server may comprise a processor 60, memory 62, server I/O unit 64, registration module 70, customer card/account data verification module 72, authorization module 74, encryption module 76, and decryption module 78.

Figure 6:
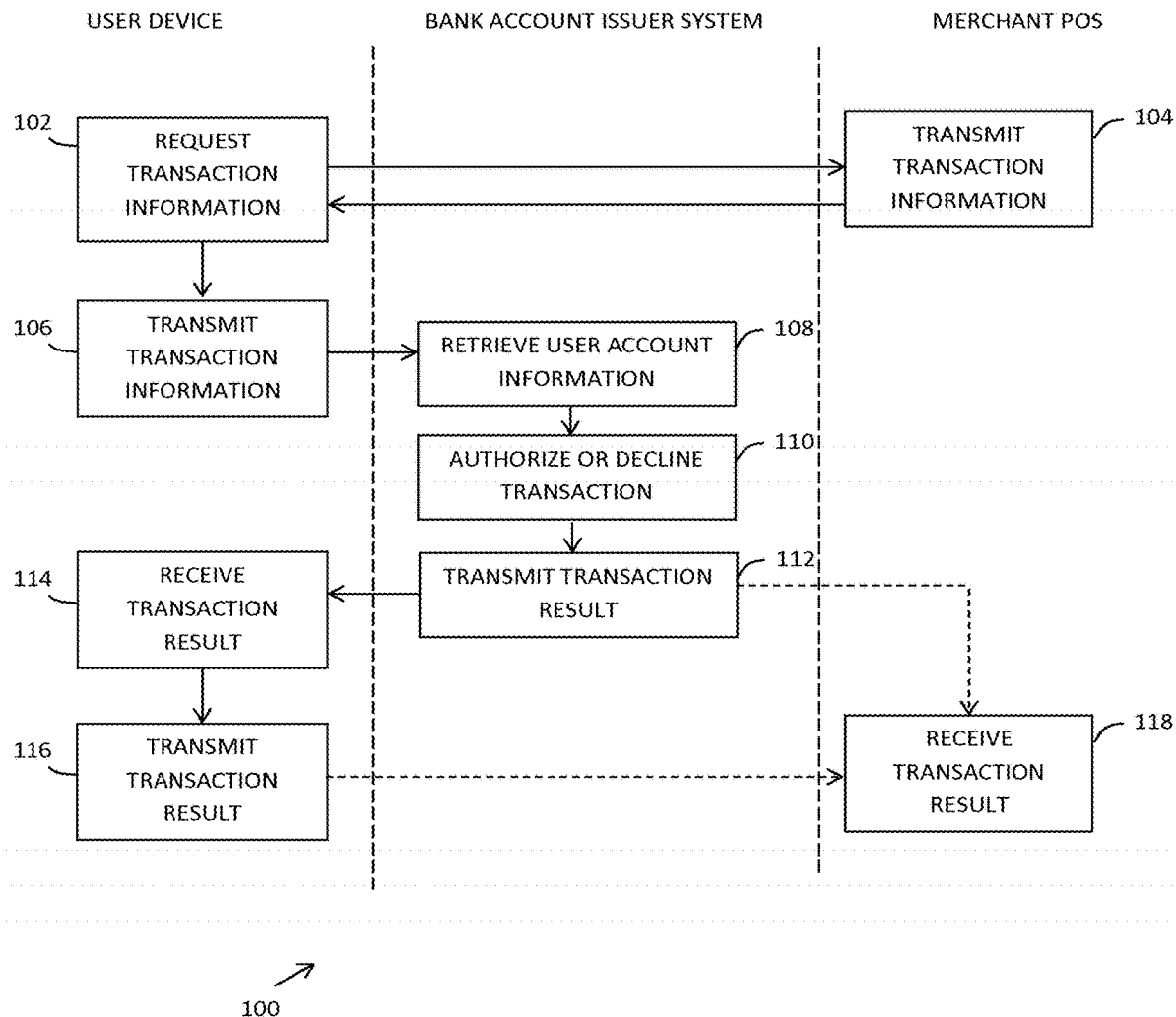
FIG. 6 is a flow chart of a transaction for requested services with a mobile device within the payment system shown in FIG. 1 in accordance with an embodiment of the invention.

Referring to FIG. 6, a flow chart 100 is shown of a transaction for requested services, such as a payment transaction, with a mobile device within the payment system shown in FIG. 1 in accordance with an embodiment of the invention. The method begins when a customer wants to pay with their mobile device 12 at a merchant location with a POS terminal 14. The customer with the mobile device 12 requests transaction information 102 or service data from the POS terminal 14 for the service requested. The transaction information 104 may be transmitted via a number of wired and/or wireless communications such as with near field communication (NFC), quick response (QR) code, barcode, or the like. The transaction information or service data may comprise transaction amount, currency, terminal date and time, transaction type, and the like. POS terminal information or service provider data may include POS terminal identifier (ID), merchant identifier (ID), merchant location, trace number, and the like. The transaction information is transmitted 106 from the mobile device 12 to the server 22. The mobile application running on the mobile device may add additional information such as account identifier data, customer ID, code card, and other customer related information, for example a code for a card issued to the customer, to the transaction information, in order to identify the customer for processing by the payment engine.

Upon receiving the data from the mobile device, the server retrieves the user account information 108 and any other customer linked information necessary to complete the transaction by accessing the customer account or cards database 24. The cards database 24 sends the actual account data back to the server 22. The server then requests authorization to either authorize or decline the transaction 110 to authorization system 26. The authorisation system 26 transmits transaction result 112 back to the payment engine/server 22. The authorisation system 26 will transmit authorization data that may comprise a response code and an authorisation code. The response code may specify if the transaction is approved and if rejected may specify the reason for rejection. Upon receiving the transaction result 114, the server 22 transmits the transaction result 116 to either or both the customer mobile device 12 and/or the merchant POS 14. The merchant POS terminal 14 may receive the transaction result 118 via the customer mobile device 12 and/or the server 22. The POS terminal 14 may pull the result from the server 22.

The mobile device 12 and/or the POS terminal 14 will each be enabled with the appropriate I/O unit equipment to transfer information, such as being able to connect to the network such as the Internet, NFC enabled equipment, QR code scanners and readers, barcode scanners and readers, virtual wallet applications and the like.

It will be appreciated that secure hypertext transfer protocol (HTTPS) and any suitable messaging protocol, for example, Java Script Object Notation (JSON) format, and the like, may be enabled between the mobile device 12 and the server 22, and the server 22 and the cards database 24 and/or card authorization system 26 of the bank card issuer system 16, such as messaging protocols such as for example international organization for standardization (ISO) protocols such as ISO8583, and the like.

The actual account data stored in the cards database 24 may comprise card number, account number, expiration date of card, track data, transaction reference number and the like. The chip card data may be required in some transactions, such as Europay, Mastercard, and Visa (EMV) transactions to the card authorization system 26.

Advantageously, it will be appreciated that the customer card information is not exposed to the merchant POS terminal and/or the customer mobile device. This is particularly useful in mobile POS (mPOS) configurations. Accordingly, there is no payment card industry (PCI)/data security standard (DSS) compliance requirement that merchants must comply with as no confidential data is processed by the merchant. Additionally, there is no need for the customer to maintain card or account data and information on the mobile device 12. All card and/or account data and information is stored remotely in the cards and accounts database 24. The bank card issuer system may be configured differently via secure configurations such as on a single server, separate servers, distributed computer networks, stored on private, public, or hybrid cloud configurations, and/or any combinations thereof.

An embodiment may also be realized for online payments, for example, the customer does not need to enter card details on the merchant web site. There is no physical POS terminal required, however, the merchant website as a virtual POS (vPOS) terminal may generate and display transaction data in a format transferrable to the mobile device 12, such as for example a QR code, barcode, or the like, which the mobile device may scan and read to retrieve the transaction data. The transaction data may be displayed on a mobile POS (mPOS) terminal such as a monitor or display of a computer such as a personal computer, laptop computer, tablet computer, smartphone, mobile phone, and the like.

Figure 7:
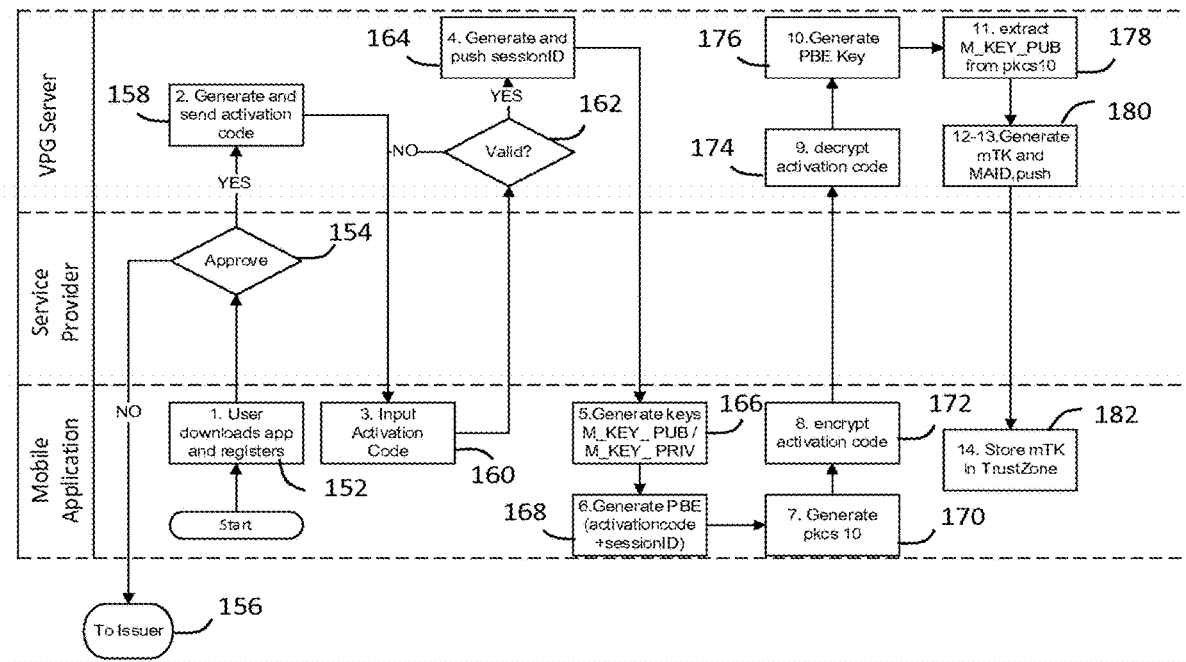
FIG. 7 is a flow chart of communication between the mobile device with the server within the payment system shown in FIG. 1 shown in more detail during activation and registration of the mobile device in accordance with an embodiment of the invention.

Referring to FIG. 7, a flow chart 150 is shown of communication in more detail between the mobile device with the server within the payment system shown in FIG. 1 during authentication, activation and registration of the mobile device in accordance with an embodiment of the invention. A user with the mobile device 12 downloads application from a device application store, the bank issuer's website, or the like, and registers with server 152 of the bank card issuer system 16. During registration, activation data such as the mobile station international subscriber directory number (MSISDN) or registered telephone number of the mobile telephone of the mobile device 12 of the customer is provided to the virtual payment gateway (VPG) server 22. The service provider approves 154, and a request sent to server 22. If the service provider does not approve, a notice is sent 156 to the issuer. The server 22 receives user request to register with mobile device and generates 158 and sends an activation code or user identifier to mobile device 12 via secure means, such as for example an email to an email account of the user, a short message service (SMS) sent to the mobile device or mobile application, or the like. The activation code is generated by the VPG server 22, and provide to the consumer or mobile application during activation. Upon receiving the activation code, the consumer enters 160 the activation code or user identifier data in the mobile device 12 and sends to server 22. The mobile application of the mobile device 12 may automatically retrieve the activation code from a received SMS. The issuer may use its own validation code using its own process.

Upon receiving the activation code or user identifier from the mobile device 12, the server checks 162 and verifies to see if the activation code is valid. If the activation code is not valid, the server 22 may send another activation code to mobile device 12. If valid and verified, then the server generates 164 an activation session identifier data such as session identifier (ID), "sessionID" and pushes the session identifier to the mobile application of the mobile device 12. The sessionID is signed with a virtual payment gateway server private key (VPG_KEY_PRIV) and sent to the mobile device 12. The mobile device receives and validates the virtual payment gateway server public key (VPG_KEY_PUB) certificate. The sessionID may be a server 22 generated random number that is used to derive the mobile device transport session key (msTK) from the mobile device transport key (mTK), discussed in more detail.

The mobile device 12 receives and validates the session identifier (ID) and generates 166 a mobile device key pair, comprising a public key, VPG mobile application public key (M_KEY_PUB), and a private key, VPG mobile application private key (M_KEY_PRIV). The key pairs may be Rivest Shamir Adleman (RSA), elliptic curve, or the like private/public keys. The mobile application of the mobile device 22 generates 168 a password base encryption (PBE) key (M_PBE_KEY) based on the customer activation code (or user identifier (ID)) and session identifier (ID). The PBE is a method of cryptography relying on a password, such as for example password based encryption standard (pkcs) #5. The mobile application of the mobile device 12 generates 170 a public-key certification request, for example pkcs #10, to request certification of public key, creating a pkcs10 which also contains a message authentication code (MAC), based on (M_PBE_KEY) to warrant integrity and authenticity. The mobile application may use password-based encryption by using large iteration counts, allowing the count to be increased over time and allowing re-encryption of backups. The self-signed key, such as pkcs #10, is used to prove that the public key belongs to its associated private key, as discussed in request for comments (RFC) 2986. The mobile application of the mobile device encrypts 172 the activation code, or user ID using the VPG server certificate public key (VPG_KEY_PUB), and sends the encrypted activation code, or user ID, including the pkcs #10 to the server 22. Secure socket layer (SSL) may be used for ensuring security of data transferred back to the server 22.

The server decrypts 174 activation code using server private key certificate (VPG_KEY_PRIV), and generates 176 password base encryption (PBE) key (M_PBE_KEY), that is based on the customer activation code, or user ID, and session code, as in step 168, previously. The server extract 176 (M_KEY_PUB) from pkcs #10 and verifies the contained digital signature, for example self-signed certificate request. The server generates 180 a mobile device transport key (mTK) and a mobile application/device identifier (MAID) and wraps it with (M_KEY_PUB), signs the message with (VPG_KEY_PRIV). The server pushes the wrapped and signed advanced encryption standard (AES) key and the mobile application/device identifier (MAID) to the mobile device 12. The created certificate request may contain a MAC which may be AES type, derived from the VPG master key. The VPG master key is used to derive mobile application specific mobile device transport key (mTK), as described in detail. The mobile application of the mobile device 12 validates 182 the signature with (VPG_KEY_PUB) and stores the wrapped mobile device transport key (mTK).

It will be appreciated that in the embodiment described the MSISDN is used to send a push message to the mobile device. In another embodiment a mobile operating system (OS) specific-push service may be used such as for example Google Cloud Messaging (GCM), or the like. In this embodiment, the mobile application may need to register with such a service, and then the resulting identifier should be supplied to the VPG server 22.

Figure 8:
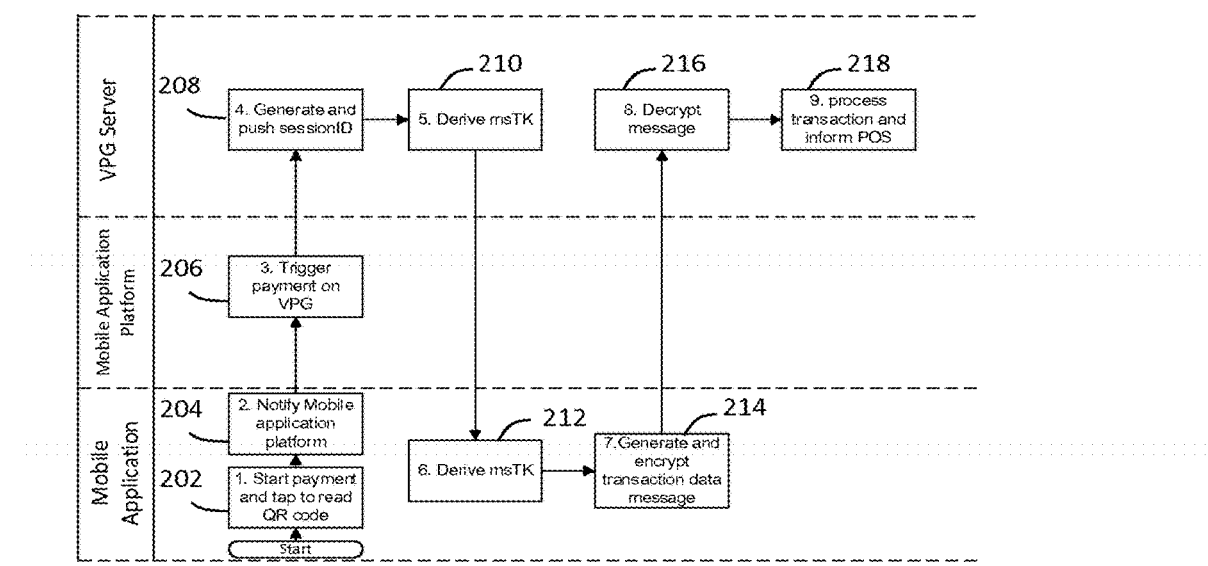
FIG. 8 is a flow chart of communication between the mobile device and the server within the payment system shown in FIG. 1 shown in more detail during execution of a requested service such as a secure payment transaction with a mobile device in accordance with an embodiment of the invention.

Referring to FIG. 8, a flow chart 200 is shown of a method in accordance with an embodiment of the invention. More specifically, the flow chart of FIG. 8 shows communications between the mobile device and the server within the payment system during execution of a requested service, such as a secure payment transaction, with a mobile device in accordance with an embodiment of the invention. The mobile device starts the payment transaction process by reading 202 transaction data from the POS terminal 14. The mobile application/device notifies 204 the mobile application platform that a transaction should be performed. The mobile application platform uses an application programming interface (API) such as a web service offered by the server 22 to trigger 206 a payment, and supplies the server 22 with the "user ID".

The server notification service generates 208 a session identifier (ID), "sessionID", and pushes the sessionID to the mobile application. The server derives 210 a mobile device transport session key (msTK) is a key that is generated independently on both the server and the mobile application, and is based on the server generated session identifier (ID) and the mutually established mobile device transport key (mTK), derived from the server master key, and sent to mobile device. The mobile device transport key (mTK) may be an AES key that is derived from the VPG server master key.

The mobile device receives and derives 212 the mobile device transport session key (msTK) based on the session identifier derived a session key for the mobile device transport key (mTK). The mobile device generates and encrypts 214 a message including the transaction data captured from the POS terminal; the message is encrypted using the mobile device transport session key (msTK).

The server decrypts 216 the encrypted message using the mobile device transport session key (msTK). The server processes the transaction 218 and informs either or both the mobile device and/or the POS terminal of the transaction result.

The description of the above example explains the payment process in the usual case where the transaction and parties are legitimate and all of the authentications are successful. It will be understood that, in general, if an authentication fails the transaction will be aborted or delayed while further checks or alternative procedures are followed. The decision whether to abort or delay the transaction, and/or exactly what further or alternative action will be taken will vary from case to case.

The secure transaction software may also manage the creation of new virtual cards on the mobile phone and the downloading and storing of the necessary virtual card details such as authenticating credentials and/or certificates. In some examples this may be carried out by loading a suitable application onto the mobile phone. Standard over the air (OTA) protocols may be used, for example SMS or CATTP.

As is explained above, the described method allows the secure element which carries out critical security functions of verifying the mobile device and user identity to be located at a remote security server, rather than on the mobile phone itself. This allows the operator of the security server, for example a bank, to maintain full control of the security system. This may allow them to define or change the security system unilaterally without requiring the agreement and cooperation of all of these parties.

Further, the memory and processing power requirements of the secure element can be largely transferred from the mobile device to the server. Accordingly, there may be fewer problems of mobile phones, or processors associated with the mobile phones, not being able to support the security system, even if the security system is improved over time to counter new threats.

Further, any possible increased security risks when the mobile phone is a smartphone may be avoided because the secure element is on the server and is not directly accessible from the mobile phone.

In the above example the mobile communication device is a mobile phone. In other examples other mobile communication devices may be used, such as a smartphone, a tablet computer, or the like. This list of examples is not intended to be exhaustive.

The above example refers to the mobile phone sending data identifying a virtual card. This data may be regarded as identifying a user financial account. Further, in some examples the data may identify a user financial account without identifying the corresponding virtual card. Since the virtual card is virtual, it is only necessary that the data identifies the user financial account corresponding to the virtual card, it is not essential that the data identifies the virtual card itself. In some examples the virtual card and the corresponding user financial account will be identified by the same number so that data identifying the user financial account will identify the virtual card, and vice-versa.

In some embodiments a user personal identification number (PIN) may be used to verify the identity of users or consumers. In other examples other forms of user identity verifier may be used, provided that the mobile phone is able to support them. For example, a user may be identified by a cryptogram, a gesture, a pressure profile of a user signature, user biometrics, or the like. This list of examples is not intended to be exhaustive.

The description above relates to the use of the method and system to make purchases. In other examples the method and system can be used to carry out other types of transactions. In one example, the POS device could be an electronic door lock and the transaction could be the unlocking of the door so that the mobile communication device can be used as a door key. This example may be particularly useful in hotels. In another example the POS device could be an access control device such as a turnstile or barrier so that the mobile communication device can be used as a pass or ticket. This example may be useful for security or allowing passengers onto trains. In another example the POS device could permit access to or control of parts of a computer system or network, for example allowing access to a part of a network through a logical portal.

In an embodiment the Internet is the public communications network. In other embodiments other communications may be used. In some examples the public communications network may be general packet radio service (GPRS), a mobile network operator (MNO) owned data packet network, or the like.

The apparatus described above may be implemented at least in part in software. Those skilled in the art will appreciate that the apparatus described above may be implemented using general purpose computer equipment or using bespoke equipment. The hardware elements, operating systems and programming languages of such computers are conventional in nature, and it is presumed that those skilled in the art are adequately familiar therewith. Of course, the server functions may be implemented in a distributed fashion on a number of similar platforms, to distribute the processing load.

Here, aspects of the methods and apparatuses described herein can be executed on a mobile station and on a computing device such as a server. Program aspects of the technology can be thought of as "products" or "articles of manufacture" typically in the form of executable code and/or associated data that is carried on or embodied in a type of machine readable medium. "Storage" type media include any or all of the memory of the mobile stations, computers, processors or the like, or associated modules thereof, such as various semiconductor memories, tape drives, disk drives, and the like, which may provide storage at any time for the software programming. All or portions of the software may at times be communicated through the Internet or various other telecommunications networks. Such communications, for example, may enable loading of the software from one computer or processor into another computer or processor. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible non-transitory "storage" media, terms such as computer or machine "readable medium" refer to any medium that participates in providing instructions to a processor for execution.

Hence, a machine readable medium may take many forms, including but not limited to, a tangible storage carrier, a carrier wave medium or physical transaction medium. Non-volatile storage media include, for example, optical or magnetic disks, such as any of the storage devices in computer(s) or the like, such as may be used to implement the encoder, the decoder, etc. shown in the drawings. Volatile storage media include dynamic memory, such as the main memory of a computer platform. Tangible transmission media include coaxial cables; copper wire and fiber optics, including the wires that comprise the bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards, paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will appreciate that while the foregoing has described what are considered to be the best mode and, where appropriate, other modes of performing the invention, the invention should not be limited to specific apparatus configurations or method steps disclosed in this description of the preferred embodiment. It is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings. Those skilled in the art will recognize that the invention has a broad range of applications, and that the embodiments may take a wide range of modifications without departing from the inventive concept as defined in the appended claims.

Although the present invention has been described in terms of specific exemplary embodiments, it will be appreciated that various modifications, alterations and/or combinations of features disclosed herein will be apparent to those skilled in the art without departing from the spirit and scope of the invention as set forth in the following claims.

Embodiments of the invention have been described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by the applicable law. Moreover, any combination of the above-described elements in all possible variations thereof is encompassed by the invention unless otherwise indicated herein or otherwise clearly contradicted by context.

The invention claimed is:

1. A method comprising:
generating, by a server, an activation session identifier;
sending the activation session identifier to a mobile device, wherein the mobile device receives and validates the activation session identifier, and generates a mobile device key pair comprising a mobile application public key and a mobile application private key;
receiving, by the server, the mobile application public key,
generating, by the server, a mobile device transport key (mTk) using a server master key, storing the mobile device transport key (mTk), and assigning a mobile application identifier to a mobile application in the mobile device;
sending, by the server, the mobile device transport key (mTk) and the mobile application identifier to the mobile device, wherein the mobile device receives and stores the mobile device transport key (mTK), and the mobile device thereafter receives transaction data from a service provider device for a requested service;

receiving, by the server from the mobile device, the mobile application identifier;

generating, by the server, a transaction session identifier, and a mobile device session transport key (msTK) based on the transaction session identifier and the mobile device transport key (mTK);

sending, by the server, the transaction session identifier to the mobile device, wherein the mobile device generates the mobile device session transport key (msTK) using the transaction session identifier and the mobile device transport key (mTK), and encrypts the transaction data using the mobile device session transport key (msTK);

receiving, by the server, the encrypted transaction data;

decrypting, by the server, the transaction data using the mobile device session transport key (msTK);

verifying, by the server, the transaction data and the mobile device; and if the verifying of the transaction data and the mobile device are successful, sending, by the server, authorization data to the service provider device.

2. The method of claim 1 wherein a message including the mobile device transport key (mTk) and the mobile application identifier is signed with a private key of the server.

3. The method of claim 1 wherein the mobile application public key is encrypted with a password base encryption key (PBE) based on activation data received by the server from the mobile device prior to generating the activation session identifier.

4. The method of claim 3, wherein the activation data is an activation code.

5. The method of claim 1, wherein the mobile application public key is received at the server with a certificate request is generated by the mobile device by creating a pkcs 10 and comprising a message authentication code (MAC) inside the pkcs 10.

6. The method of claim 1 wherein the mobile device transport key (mTK) is an AES (Advanced Encryption Standard) key.

7. The method of claim 1 wherein communication between the mobile device and the server is a secure sockets layer (SSL) communication.

8. The method of claim 1 wherein the service provider device is a point of sale (POS) terminal.

9. The method of claim 1 wherein the service provider device is a mobile point of sale (mPOS) terminal.

10. The method of claim 1 wherein the service provider device is a virtual point of sale (vPOS) device.

11. The method of claim 1 wherein the service provider device is a website.

12. The method of claim 1 wherein the mobile device is a mobile phone.

13. A system comprising:

one or more processors; and one or more computer readable media, the one or more computer readable media comprising code executable by the one or more processors, to implement a method comprising:

generating, by a server, an activation session identifier;

sending the activation session identifier to a mobile device, wherein the mobile device receives and validates the activation session identifier, and generates a mobile device key pair comprising a mobile application public key and a mobile application private key;

receiving, by the server, the mobile application public key, generating, by the server, a mobile device transport key (mTk) using a server master key, storing the mobile device transport key (mTk), and assigning a mobile application identifier to a mobile application in the mobile device;

sending, by the server, the mobile device transport key (mTk) and the mobile application identifier to the mobile device, wherein the mobile device receives and stores the mobile device transport key (mTK), and the mobile device thereafter receives transaction data from a service provider device for a requested service;

receiving, by the server from the mobile device, the mobile application identifier;

generating, by the server, a transaction session identifier, and a mobile device session transport key (msTK) based on the transaction session identifier and the mobile device transport key (mTK);

sending, by the server, the transaction session identifier to the mobile device, wherein the mobile device generates the mobile device session transport key (msTK) using the transaction session identifier and the mobile device transport key (mTK), and encrypts the transaction data using the mobile device session transport key (msTK);

receiving, by the server, the encrypted transaction data;

decrypting, by the server, the transaction data using the mobile device session transport key (msTK);

verifying, by the server, the transaction data and the mobile device; and if the verifying of the transaction data and the mobile device are successful, sending, by the server, authorization data to the service provider device.

14. The system of claim 13, wherein the service provider device is a POS terminal.

15. The system of claim 13, wherein the mobile device is a mobile phone.

16. The system of claim 13, wherein the transaction session identifier is a random number.

17. The system of claim 13, wherein the server is a remote security server.

18. The system of claim 13, wherein the transaction data comprises a merchant identifier.

19. The method of claim 13, wherein the transaction data comprises account identifier data and a merchant identifier.

20. The method of claim 13, wherein the method further comprises receiving activation data by the server from the mobile device.

* * * * *